US011936778B2

(12) United States Patent
Krauthamer et al.

(10) Patent No.: US 11,936,778 B2
(45) Date of Patent: Mar. 19, 2024

(54) SYSTEMS AND METHODS OF POST-QUANTUM SECURITY MANAGEMENT

(71) Applicant: Qusecure, Inc, San Mateo, CA (US)

(72) Inventors: David Steven Krauthamer, Tiburon, CA (US); Samuel Joseph Sanzeri, San Mateo, CA (US); Konstantin Vilk, Belmont, CA (US); Rebecca Rose Krauthamer, Menlo Park, CA (US); Austin Graham Bosarge, Petaluma, CA (US); Barry Scott Van Hooser, Tracy, CA (US)

(73) Assignee: QuSecure, Inc., San Mateo, CA (US)

( * ) Notice: Subject to any disclaimer, the term of this patent is extended or adjusted under 35 U.S.C. 154(b) by 432 days.

(21) Appl. No.: 17/218,100

(22) Filed: Mar. 30, 2021

(65) Prior Publication Data

US 2021/0306145 A1 Sep. 30, 2021

Related U.S. Application Data

(60) Provisional application No. 63/002,062, filed on Mar. 30, 2020.

(51) Int. Cl.
*H04L 9/08* (2006.01)
*H04L 9/06* (2006.01)
*H04L 9/40* (2022.01)
*H04L 9/00* (2022.01)

(52) U.S. Cl.
CPC .............. *H04L 9/0852* (2013.01); *H04L 9/06* (2013.01); *H04L 63/0428* (2013.01); *H04L 63/20* (2013.01); *H04L 9/50* (2022.05)

(58) Field of Classification Search
CPC ..... H04L 9/0852; H04L 9/06; H04L 63/0428; H04L 63/20; H04L 9/50; H04L 2463/082; H04L 9/3239
See application file for complete search history.

(56) References Cited

U.S. PATENT DOCUMENTS

10,439,804 B2 * 10/2019 Zhang ..................... H04L 9/065
11,399,017 B1 * 7/2022 Stapleton .............. H04L 9/0852
11,489,660 B2 * 11/2022 Pentland ................... H04L 9/14
(Continued)

*Primary Examiner* — Baotran N To
(74) *Attorney, Agent, or Firm* — Barry Van Hooser; Derek Jennings; Baruch Feldman (57) ABSTRACT

A Data Security Management System using a communications interface configured to receive and transmit one or more portions of Post Quantum Resistant Encrypted data within a network comprising a plurality of endpoints. Using End-to-End (E2E) Post Quantum Resistant encryption techniques to protect the data, the Data Security Management System provides the flexibility for multiple data schemes in a distributive environment such as, but not limited to, Hyperledger. The system uses a Policy Manager to perform the base configuration of the session to be transmitted or received in an encrypted state. This encrypted state comprises Post Quantum Cryptographic algorithm in use for that session, inclusive with associated keys or digital signatures. The Policy Manager is further configured to verify an identity of endpoint by a multifactor cryptographic authentication mechanism or a biometric authentication mechanism to validate a connection to or from an endpoint.

31 Claims, 5 Drawing Sheets

(56) References Cited

U.S. PATENT DOCUMENTS

| | | | |
|---|---|---|---|
| 11,533,175 B1* | 12/2022 | Rao | G06N 20/00 |
| 11,552,793 B1* | 1/2023 | Shea | H04L 9/3215 |
| 2018/0241552 A1* | 8/2018 | Kurian | H04L 9/0852 |
| 2018/0241565 A1* | 8/2018 | Paolini-Subramanya | H04L 9/0637 |
| 2019/0132120 A1* | 5/2019 | Zhang | H04L 9/16 |
| 2020/0235915 A1* | 7/2020 | Wright | H04L 9/0872 |

\* cited by examiner

SYSTEMS AND METHODS OF POST-QUANTUM SECURITY MANAGEMENT

RELATED APPLICATIONS

The applicant claims the benefit under 35 USC 119(e) of U.S. Provisional Application No. 63/002,062 filed on Mar. 30, 2020 which is incorporated herein by reference in its entirety.

BACKGROUND OF THE INVENTION

The development of non-classical computers may pose a threat to existing encryption algorithms. Recognized herein is a need for improved security systems which may be more resilient to non-classical computations systems. Improved security systems may be flexible for various types of computing and communication hardware. Improved security systems may be accessible to a user while providing security. The subject matter disclosed herein relates generally to a security management system, and in particular a to a system that encrypts and decrypts data utilizing post-quantum cryptographic algorithms using keys that can be rotated or substituted, and cryptographic algorithms that can be rotated or substituted.

BRIEF DESCRIPTION OF THE INVENTION

In an aspect the present disclosure provides a data security management system. The data security management system may comprise: a communications interface configured to receive and transmit at least one portion of encrypted data to be transmitted within a network comprising a plurality of nodes; a first node comprising: memory configured to store a first portion of the at least one portion of encrypted data to be transmitted, wherein the first portion comprises a copy of a distributed data structure and an addition to the distributed data structure; and at least one computing device operatively coupled to the memory, wherein the at least one computing device are individually or collectively programmed to: (1) receive, at the first node, at least one second portion of the encrypted data to be transmitted from at least one second node of the distributing computing system, (2) decrypt the first portion and each of the at least one second portion using at least one post-quantum cryptographic algorithm to yield at least one decrypted portion; and (3) reassemble the at least one decrypted portion to yield a decrypted copy of the encrypted data to be transmitted; and (4) store the reassembled data.

In some embodiments, at least one computing device is configured to compare the decrypted copy of the encrypted data to be transmitted to at least one copy of the encrypted data to be transmitted on at least one third node. In some embodiments, at least one computing device is configured to hash or encrypt the encrypted data to be transmitted based on a consensus between the first node and at least one third node.

In some embodiments, at least one computing device is configured to verify or validate a connection from a remote endpoint, at least one second node, or at least one third node using a post-quantum digital signature. In some embodiments, at least one computing device is configured to verify or validate a connection from a remote endpoint, the at least one second node, or at least one third node using a cryptographic algorithm. In some embodiments, at least one computing device configured to verify or validate a connection from the remote endpoint, at least one second node, or at least one third node.

In some embodiments, the system comprises memory (or data storage) configured to store a master copy of the distributed data structure in the memory, wherein the master copy of the distributed data structure is stored encrypted by the at least one post-quantum cryptographic algorithm in the memory.

In some embodiments, the at least one computing device are configured to encrypt the master copy with the at least one post-quantum cryptographic algorithm. In some embodiments, at least one post-quantum cryptographic algorithm used to encrypt the master copy is changed with another cryptographic algorithm automatically or as needed. In some embodiments, the distributed computing system comprises a cryptographic security policy manager, the policy manager configured to perform at least one of the following: to serve at least one post-quantum cryptographic algorithms, to manage at least one key, and to serve at least one digital signature.

In some embodiments, the distributed computing system comprises a plurality of network switches, wherein at least one node of the plurality of nodes comprise at least one network switch, the network switch operably connected to the communications interface. In some embodiments, the communications interface is operably connected to a communications manager providing central monitoring of the distributed computing system. In some embodiments, the at least one network switch is operably connected to a quantum key distribution device, wherein the quantum key distribution device is used to monitor a connection between the network switch and the communications manager.

In some embodiments, a device is able to detect a break in a connection and wherein the port is not trusted rather than the switch. In some embodiments, a loss of entanglement invalidates an encryption key. In some embodiments, the distributed computing system is a peer-to-peer network. In some embodiments, the distributed computing system comprises a three-tier system, wherein client information is stored on a middle tier rather than at an endpoint or a central server. In some embodiments, the distributed computing system is an n-tier system.

In some embodiments, a consensus algorithm is employed by the at least one-node to reach a common decision about a state of the distributed data structure. In some embodiments, the at least one-post-quantum cryptographic algorithm used to encrypt transmitted data is changed with another cryptographic algorithm automatically or as needed.

In some embodiments, at least one computing device[[s are]] is configured to verify an identity of another node before transmitting or receiving encrypted data to be transmitted from another node.

In some embodiments, the system comprises a user interface in communication with the distributed computing system, wherein at least one processor is configured to verify an identity of a user of the user interface by a multifactor authentication mechanism or a biometric authentication mechanism. In some embodiments, the user interface comprises a push style authentication mechanism.

In some embodiments, the communications interface is configured to communicate with a computing system external to the distributed computing system, wherein at least one node of the plurality of nodes verifies an identity of the computing system before transmitting encrypted data to be transmitted to or receiving encrypted data to be transmitted from the computing system.

In some embodiments, the distributed computing system comprises a containerized software platform.

In some embodiments, the distributed data structure is a hyperledger. In some embodiments, the distributed data structure is a blockchain. In some embodiments, the encrypted data to be transmitted comprises transaction data relating to an exchange of digital currency.

In another aspect, the present disclosure provides a method of validating encrypted data to be transmitted from a remote location. The method may comprise: receiving a portion of the encrypted data to be transmitted from the remote location at a first node of a distributed computing system, wherein the encrypted data to be transmitted comprises a copy of a distributed data structure and an addition to the distributed data structure; receiving, at the first node, at least one second portion of the encrypted data to be transmitted from at least one second node of the distributing computing system; decrypting the first portion and each of the at least one second portion using at least one post-quantum cryptographic algorithm to yield decrypted portions; and reassembling the at least one decrypted portion to yield a decrypted copy of the encrypted data to be transmitted.

In some embodiments, the method comprises comparing the decrypted copy of the encrypted data to be transmitted to at least one other copy of the encrypted data to be transmitted on at least one third node. In some embodiments, the method comprises encrypting or hashing the encrypted data to be transmitted based on a consensus between the first node and the one or more third nodes.

In some embodiments, the method comprises verifying or validating a connection from the remote endpoint, the at least one second node, or the at least one third node using a post-quantum digital signature. In some embodiments, the method comprises verifying or validating a connection from the remote endpoint, the at least one second node, or the at least one third node using a cryptographic algorithm. In some embodiments, the method comprises verifying or validating a connection from the remote endpoint, the at least one second node, or the at least one third node using a quantum key distribution system.

In some embodiments, the method comprises maintaining a master copy of the distributed data structure, wherein the master copy of the distributed data structure is stored encrypted by the at least one post-quantum cryptographic algorithm.

In some embodiments, the one or more computing devices are configured to encrypt the master copy with the at least one post-quantum cryptographic algorithm.

In some embodiments, one or more post-quantum cryptographic algorithms used to encrypt the master copy is changed with another cryptographic algorithm automatically or as needed.

In some embodiments, the distributed computing system comprises a cryptographic policy manager, the policy manager configured to perform at least one of the following: to serve at least one post-quantum cryptographic algorithm, to manage at least one key, or to serve at least one digital signature.

In some embodiments, the distributed computing system comprises a plurality of network switches, wherein at least one node of the plurality of nodes comprise at least one network switch, the network switch operably connected to the communications interface.

In some embodiments, the communications interface is operably connected to a communications manager providing central monitoring of the distributed computing system.

In some embodiments, the at least one network switch is operably connected to a quantum key distribution device, wherein the quantum key distribution device is used to monitor a connection between the network switch and the communications manager. In some embodiments, a device is able to detect a break in a connection and wherein the port is not trusted rather than the switch. In some embodiments, a loss of entanglement invalidates an encryption key.

In some embodiments, the distributed computing system is a peer-to-peer network. In some embodiments, the distributed computing system comprises a three-tier system, wherein client information is stored on a middle tier rather than at an endpoint or a central server. In some embodiments, the distributed computing system is an n-tier system. In some embodiments, a consensus algorithm is employed by the one or more nodes to reach a common decision about a state of the distributed data structure.

In some embodiments, the one or more post-quantum cryptographic algorithms used to encrypt transmitted data is changed with another cryptographic algorithm automatically or as needed according to the security policy manger. In some embodiments, one or more computing devices are configured to verify an identity of another node before transmitting or receiving transmitted data from another node.

In some embodiments, a user interface is in communication with the distributed computing system, wherein security management system is configured to verify an identity of a user of the user interface by a multifactor authentication mechanism or a biometric authentication mechanism.

In some embodiments, the user interface comprises a push style authentication mechanism. In some embodiments, communications interface is configured to communicate with a computing system external to the distributed computing system, wherein one or more nodes of the plurality of nodes verifies an identity of the computing system before transmitting encrypted data to be transmitted to or receiving encrypted data to be transmitted from the computing system.

In another aspect, the present disclosure provides a non-transitory computer readable medium comprising machine-executable code, that upon execution by one or more processors operatively coupled to a distributed computing system, implements a method for validating encrypted data to be transmitted from a remote location, wherein the distributed computing system comprises one or more nodes, wherein a first node comprises the one or more computing devices and a memory. The method may comprise: receiving a portion of the encrypted data to be transmitted from the remote location at the first node of the distributed computing system, wherein the encrypted data to be transmitted comprises a copy of a distributed data structure and an addition to the distributed data structure; receiving, at the first node, at least one second portion of the encrypted data to be transmitted from at least one second node of the distributing computing system; decrypting the first portion and each of the at least one second portion using at least one post-quantum cryptographic algorithm to yield at least one decrypted portion; and reassembling the at least one decrypted portion to yield a decrypted copy of the encrypted data to be transmitted.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION OF THE PREFERRED EMBODIMENTS

The invention will now be described more fully hereinafter with reference to the accompanying drawings, in which illustrative embodiments of the invention are shown. While various embodiments of the invention are shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than," "less than or equal to," or "at most" applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

As used herein, like characters refer to like elements.

Figure 1:
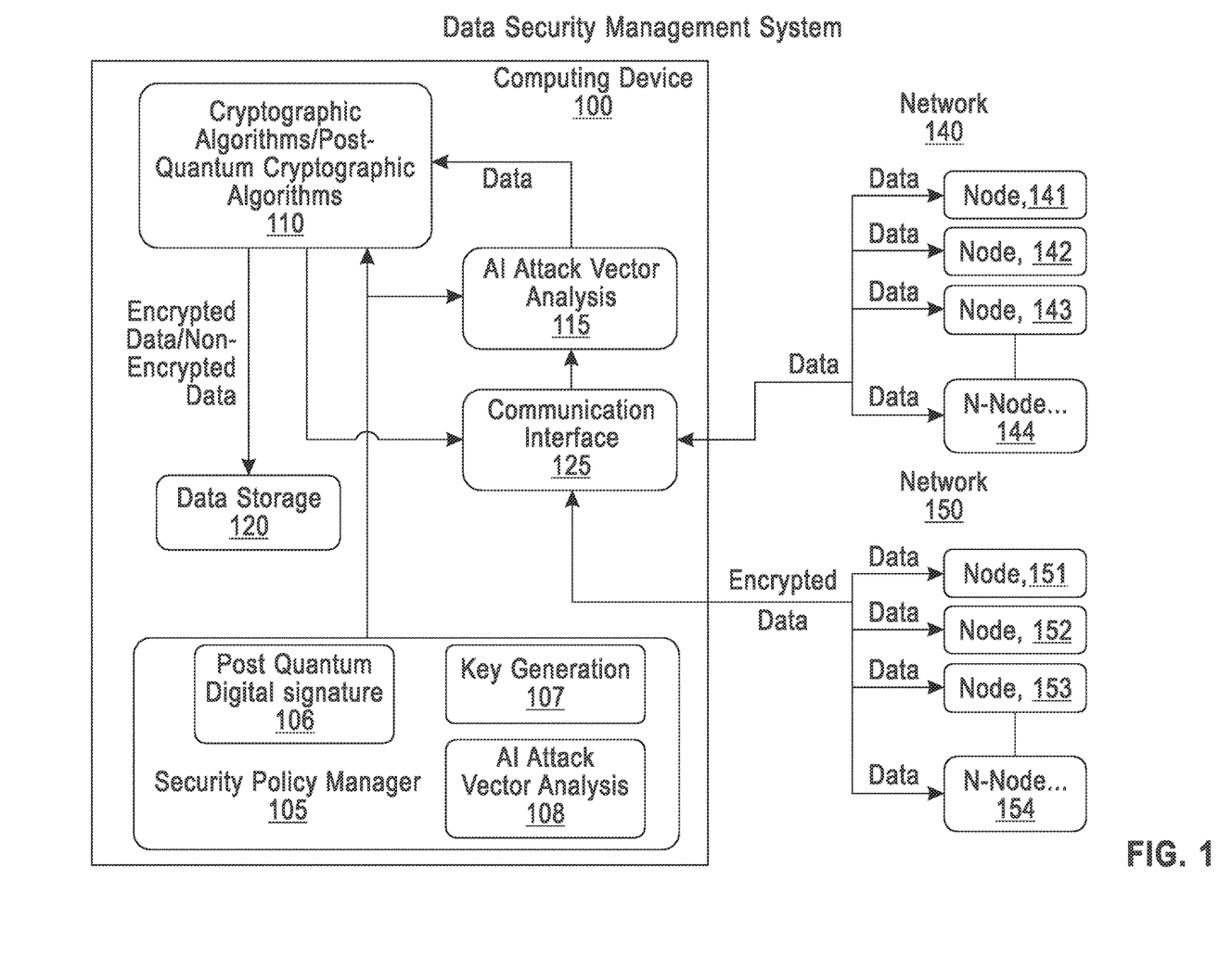
FIG. 1 shows an exemplary implementation according to an embodiment of the present invention.

FIG. 1 illustrates an example security management system in accordance with some embodiments. A computing device 100 is connected to a plurality of networks 140, 150. Network 140 contains a plurality of nodes 141, 142, 143 and 144. Network 150 contains a plurality of nodes 151, 152, 153 and 154. The networks 140, 150 transmit data to and receive data from the computing device 100. The computing device 100 includes a communication interface 125 for receiving and transmitting one or more portions of encrypted data to the nodes. An AI attack vector analysis 115 receives the encrypted data from the communication interface 125. A security policy manager 105 controls the AI attack vector analysis 115 so that each port may be treated as an attack vector allowing the security policy manager 105 to cordon off only that port or ports or node that is the target of the attack vector. The security policy manager 105 includes a post quantum digital signature 106, a key generator 107 and an AI attack vector analysis 108. A cryptographic algorithms/post quantum cryptographic algorithms 110, under the control of the security policy manager 105, receives data from the AI attack vector analysis 115 supplies either cryptographic algorithms or post quantum cryptographic algorithms to encrypt the data and supplies this encrypted data to the nodes via the communication interface 125. A data storage 120 is further use to store one or more portions of data in encrypted and non-encrypted forms. The data may be received at the node from a second node in encrypted or unencrypted form.

Figure 2A:
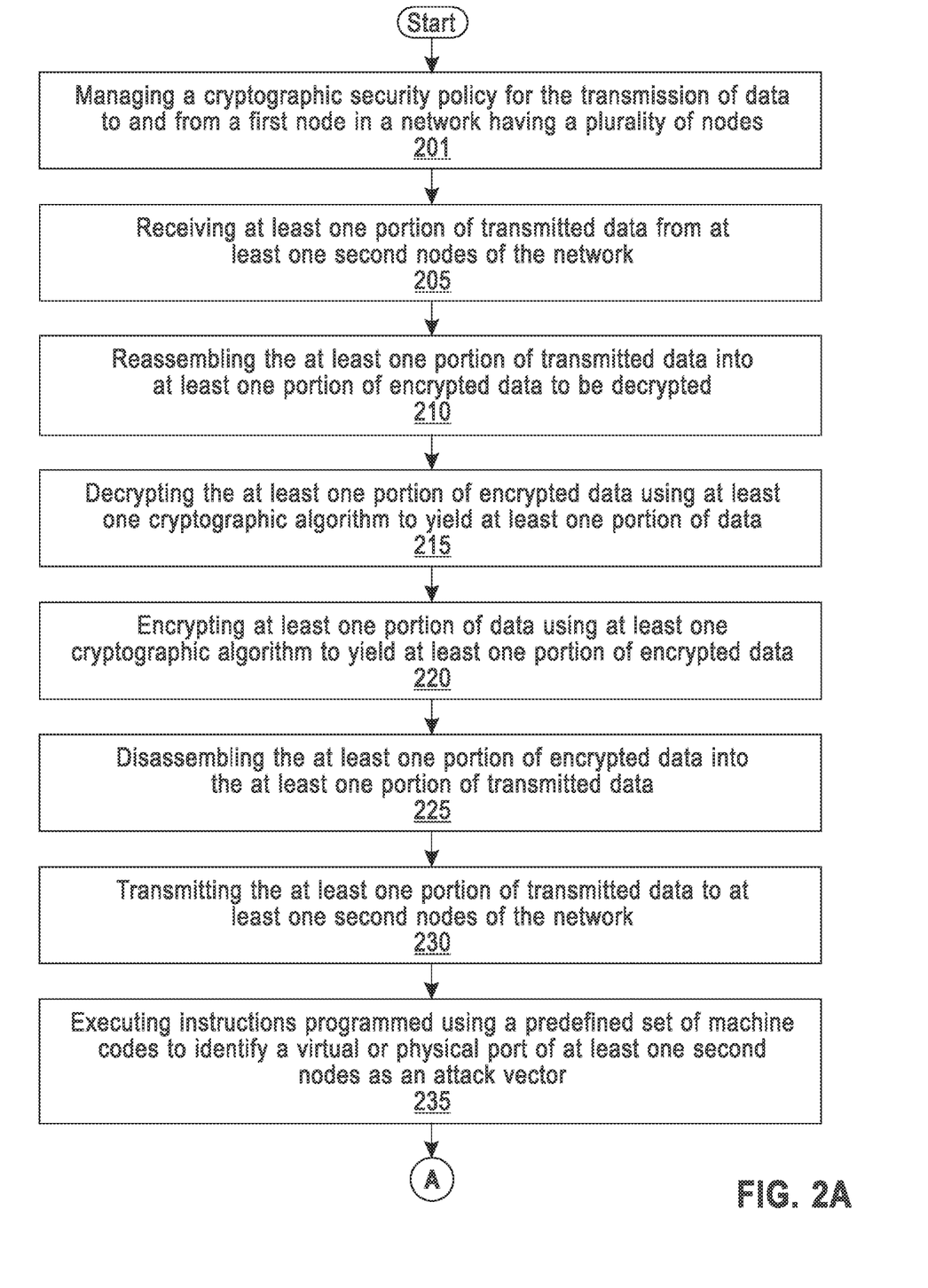
FIGS. 2A-2C. show a flowchart according to embodiments of the present invention.
Figure 2B:
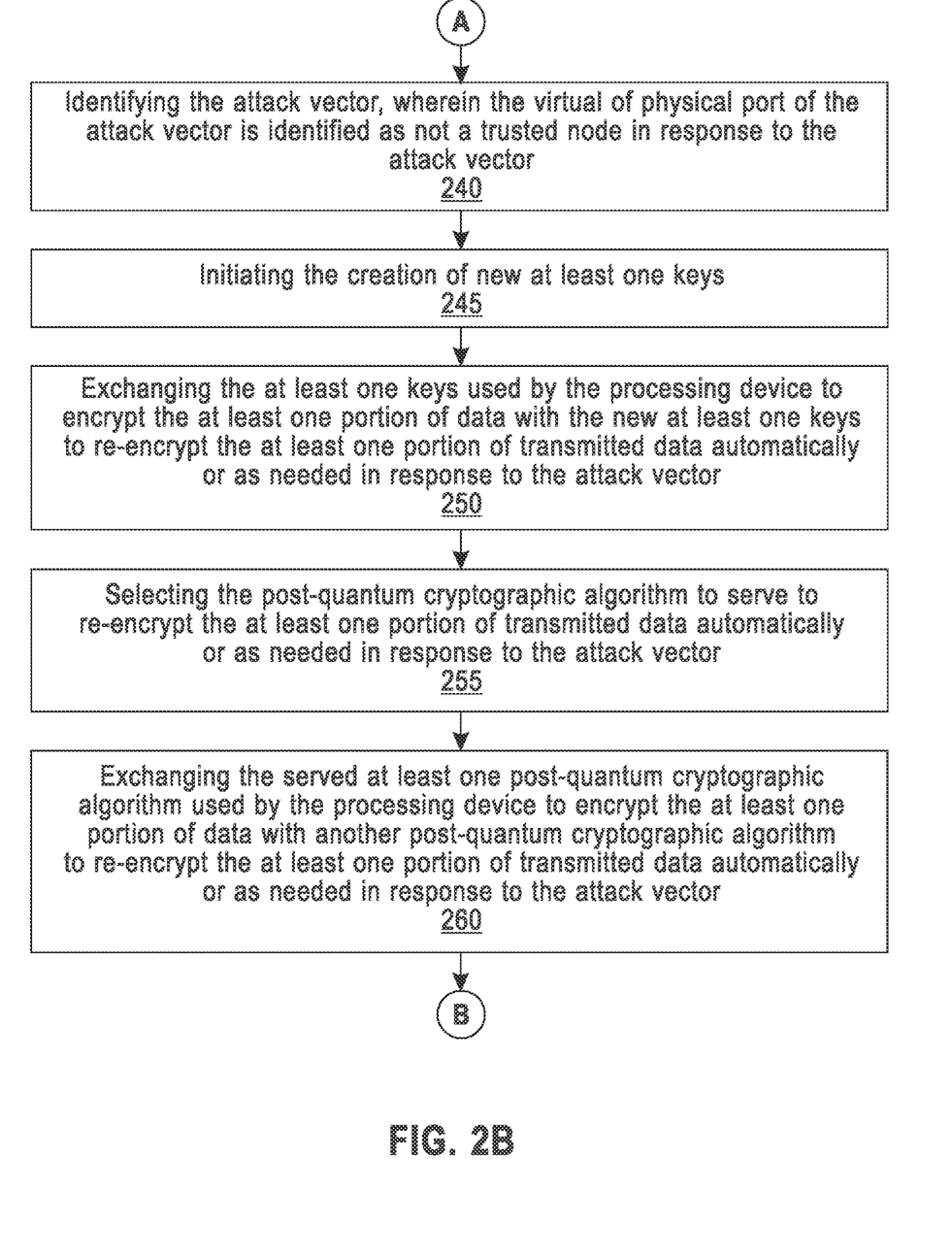
Figure 2C:
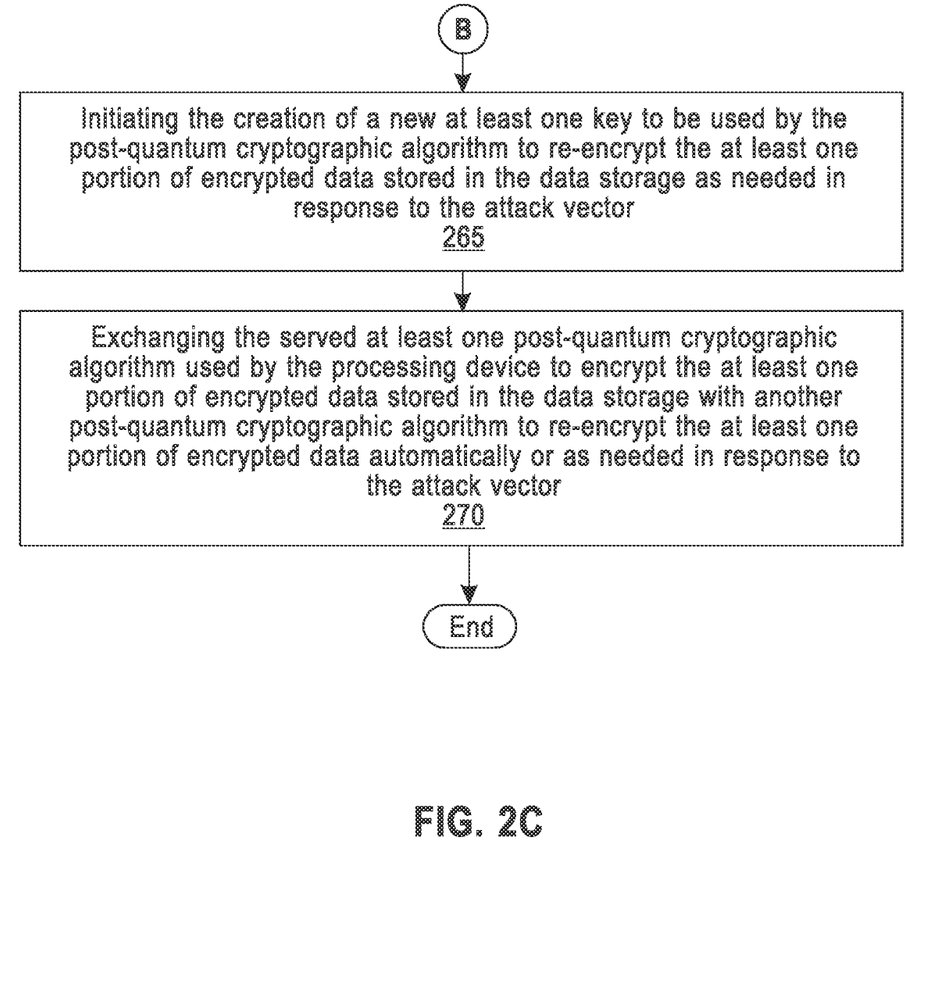

Referring to FIGS. 2A-2C, a process according an embodiment of the present invention is depicted. The process starts by managing a cryptographic security policy for the transmission of data to and from a first node in a network comprising a plurality of nodes 201, receiving at least one portion of transmitted data from at least one second node of the network 205, and reassembling the at least one portion of transmitted data into at least one portion of encrypted data to be decrypted 210. The process continues by decrypting the at least one portion of encrypted data using at least one cryptographic algorithm to yield at least one portion of data 215, encrypting at least one portion of data using at least one cryptographic algorithm to yield at least one portion of encrypted data 220, disassembling the at least one portion of encrypted data into the at least one portion of transmitted data 225, transmitting the at least one portion of transmitted data to at least one second node of said network 230, and executing instructions programmed using a predefined set of machine codes to identify a virtual or physical port of at least one second node as an attack vector 235. The process continues by identifying the attack vector, wherein the virtual or physical port of the attack vector is identified as not a trusted node in response to the attack vector 240, initiating the creation of at least one new key 245, and exchanging at least one key used by the processing device to encrypt the at least one portion of data with the new at least one key to re-encrypt the at least one portion of transmitted data automatically or as needed in response to the attack vector 250. The process continues selecting a post-quantum cryptographic algorithm to serve to re-encrypt the at least one portion of transmitted data automatically or as needed in response to the attack vector 255, exchanging the served at least one post-quantum cryptographic algorithm used by the processing device to encrypt the at least one portion of data with another post-quantum cryptographic algorithm to re-encrypt the at least one portion of transmitted data automatically or as needed in response to said attack vector 260, initiating the creation of a new at least one key to be used the post-quantum cryptographic algorithm to re-encrypt the at least one portion of encrypted data stored in the data storage as needed in response to said attack vector 265, and exchanging the served at least one post-quantum cryptographic algorithm used by the processing device to encrypt the at least one portion of encrypted data stored in the data storage with another post-quantum cryptographic algorithm to re-encrypt the at least one portion of encrypted data automatically or as needed in response to said attack vector 270.

Figure 3:
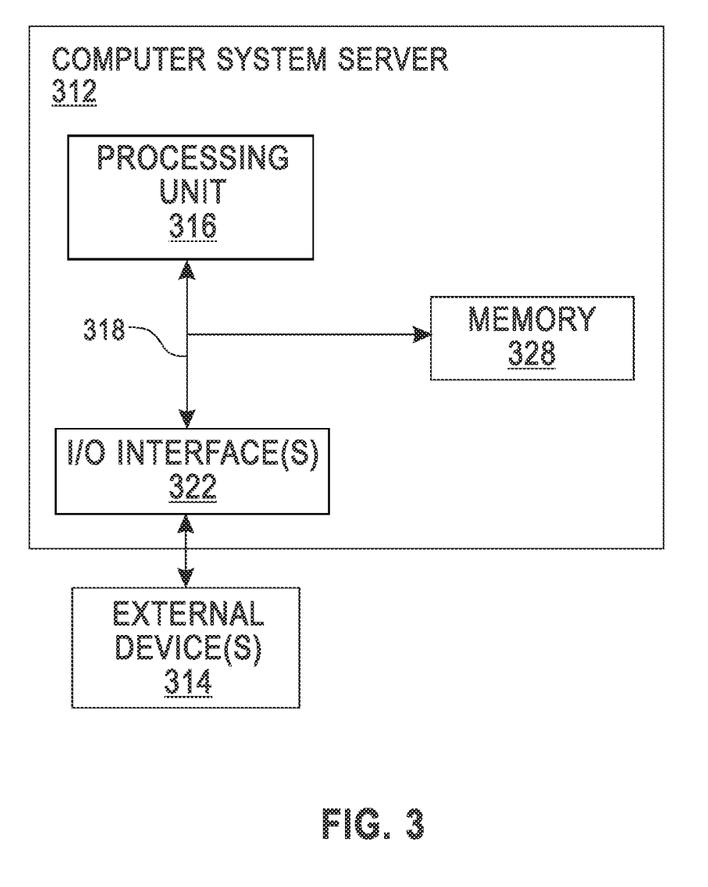
FIG. 3 illustrates a hardware configuration according to an embodiment of the present invention.

Referring now to FIG. 3 this schematic drawing illustrates a hardware configuration of an information handling/computer imaging system in accordance with the embodiments of the invention. The computer system 312 comprises at least one processor or processing unit 316. The processing unit 316 is interconnected via system bus 318 to various devices such as a memory 328 and an input/output (I/O) interface(s) 322. The I/O interface adapter 322 can connect to peripheral devices, such as external devices 314, or other program storage devices that are readable by the system. The system can read inventive instructions and follow these instructions to execute the methodology of the embodiments of the invention.

In some cases, a management system may comprise an enterprise level software platform for delivering quantum resilience and secure communications. A management suite may comprise quantum key device (QKD) defending against cyberattacks. The management system may comprise one or more of the following: one or more management servers configured to serve quantum resilient algorithms and quantum secure communications to the enterprise; one or more intuitive graphical user interfaces; one or more data warehouses of quantum resilient algorithms; an artificial intelligence to predict and defend against attacks by allocating quantum resilient algorithms and one or more protocols to enterprise nodes and communications; memory storing computer executable AI instructions; a processor configured to execute the computer executable AI instructions or machine language code; the computer executable AI instructions or machine language code; the components including cpu and gpu servers; a quantum security communications manager using QKD systems; a cryptographic security policy manager which may rotate quantum resilient algorithms including, but not limited to, post-quantum cryptographic algorithms; a quantum resilient blockchain for non-repudiation of data; a post-quantum distributed architecture; etc. The system may analyze the components and communications for the cybersecurity threats by: application of one or more AI security threat analysis modules and comparison against items in a library of previously scored threats; assigning to the threat one or more scores.

A distributed architecture may comprise one or more nodes. A node may comprise a particular compute instance, whether a physical, virtual, Cloud IaaS, PaaS or SaaS hosting QSMS. Example nodes may comprise QSMS deployed on an appliance, a virtual Appliance, an In Cloud instance (AWS, Azure, Google Cloud), IOT and sensors, edge devices, etc.

This distributed architecture may make use of a distributed a data structure. A distributed data structure may comprise a block chain. A block chain may use a consensus between copies of the records on various nodes. A distributed data structure may use a consensus between copies of the distributed records on the various nodes. A consensus between nodes may limit repudiation. A consensus may provide non-repudiation assurance. Non-repudiation may refer to the concept of not allowing a process to deny what has been established. A consensus may be determined using a consensus algorithm.

For example, two or more nodes may cryptographically agree that the digital signatures had not changed or been altered by a third party. If a consensus is reached the new writing process may be allowed to make the changes to at least some parts of the chain.

In some cases, a block chain may be based on a Peer-To-Peer network. In some cases, a block chain may maintain a copy of all transactions in an encrypted or validated state. In some cases, many or even all the transactions done among the nodes are available on each node or many of a plurality of node of the network. A consensus algorithm may be a process through which all the nodes in the blockchain network reach a common decision about the present state of the hyperledger. After a consensus is reached the data may be hashed forming another block in the chain.

The one or more nodes may communicate through a process, which may have improved security. In some cases, a communication protocol may be created between varying nodes within the distributed or traditional point to point architecture. Each node may be a processing unit where encryption or decryption is able to take place. The protocol may be designed to reduce or provide protection against interception style of attacks similar but not limited to "man-in-the-middle, session hijack and replay". The communication protocol may include instruction for a node to subdivide packets of the transmitted data. The communication protocol may include instruction for a node to encode or encrypt the packets of the transmitted data transmitted into various "data bits." The communication protocol may include instruction for a node to transmit the data bits over differing communication channels. The communication protocol may reduce the likelihood of interception and reassembly. The different channels of communication may be encoded using varying algorithms from the NIST Approved list. The data from the different channels of communication may be recompiled at the blockchain level.

A distributed architecture may separate trust assumptions for a hyperledger from trust assumptions for consensus. In some cases, fault tolerance may driven by the consensus service being provided by one set of nodes generating consensus, while the endorsers may be different for each hyperledger. The architecture may facilitate deployment of hyperledgers that have confidentiality requirements with respect to the content and state updates of its transactions.

Nodes of the security management system may communicate with each other to monitor changes in each node structure. The security management system nodes may ensure or at least partially assure that no unauthorized changes are being "side loaded" into the system or its' kernel. With node-to-node communication, each node may be configured to provide any of the other nodes a notification or alert that an attack is happening so that the security management system can take actions according to the security policy.

In some cases, the security management system may comprise a containerized software architecture. A containerized software architecture may comprise for example, Kurbernetes. A Kubernetes node may be a virtual machine (VM) or a physical machine, depending on the cluster. Each Kubernetes node may contain the services to run pods and may managed by one or more master components. The services may include the container runtime, kubelet, kube-proxy, etc.

In some cases, a containerized platform may be used to enable Zero-Trust Key Management using (e.g. serving) one or more Post-Quantum Cryptographic algorithms. The one or more post-quantum cryptographic algorithms may include NIST Round 2 Draft Approved Post-Quantum Algorithm and Signature Serving. The one or more post-quantum cryptographic algorithms may be backwards compatible with classical encryption algorithms.

In some examples, micro-segmentation logic may be used to compartmentalize an attack. For example, if a given port is attacked, it may be segmented and cordoned off from the other ports according to the security policy manager. Communications may be dropped which may limit spread of the attack across the other ports and systems. In the security management system, and further by the security policy manager, each port may be treated as an attack vector allowing the security management system to cordon off only that port or ports or node that is the target of the attack vector.

In some systems, the entire multi-port switch may be treated as the attack vector. By micro segmenting the attack, the system may cordon off the switch by isolating the attack to a smaller area, versus the entire switch.

In some cases, micro-segmentation may comprise a set of network controls. In some cases, each network interface has a detection mechanism onboard or connected to it. On detection of a threat, a network interface, a switch, or a port may be taken offline. The attempt may be recorded. An alert may be sent. In some cases, the network segment (a collection of network interfaces) may not be taken offline by the detected threat. Rather one or more network interfaces, a switch, or a physical or virtual port, may be taken offline. The network interfaces, a switch, or a physical or virtual port may be timed to allow continue function automatically based on a set of rules, which could be time based, reassessment of the threat, or some other set of rules that could be programed as machine code. The interface may stay offline until manually reconnected after internal business processes and conditions had been met, or the management system may automatically attempt to reconnect the interface.

Quantum Key Distribution (QKD) may be a secure communication method which implements a cryptographic protocol involving components of quantum mechanics. It may enable two parties to produce a shared random secret key known only to them, which can then be used to encrypt and decrypt messages. An example property of quantum key distribution may be the ability of the two communicating users to detect the presence of a third party, who may be trying to gain knowledge of the key. This may result from a fundamental aspect of quantum mechanics: for two entangled particle having a shared quantum state a measurement of one effects the state of the other. A third party trying to eavesdrop on the key introduces detectable anomalies. By using quantum entanglement and transmitting information as or coupled to quantum states, a communication system may be implemented that detects eavesdropping.

In some cases, a management system may provide infrastructure to control QKD Devices (e.g. with Multi-Vendor Support), to sense attack on the QKD, and take action in response (e.g. action against) and attack on the QKD.

In some examples, the management system may utilize deep learning and machine language code attack detection logic, which may leverage quantum entanglement sensing or other means for detecting or determining an attack vector. In some cases, a system may deploy AI attack detection logic in combination with QKD. In some cases, once communications have QKD in place, an attack may be noticeable. An associated AI may indicate to the rest of the systems that an attack is underway.

A machine learning algorithm may be a supervised learning algorithm or an unsupervised learning algorithm. A machine learning algorithm may use data which may be unstructured and/or unlabeled. In an example, a machine learning algorithm may be used with a security management suite to analyze and learn from the network traffic as reported by the API, QKD Devices, Censing on Kubernetes Containers and to create a behavior baseline or a norm. In some cases, based on the behavioral norm the machine learning algorithm may compare the baseline against actions and requests being received by the kernel. A machine learning algorithm may take one or more actions, for example, taking action against set norms to drop connection(s), tell switch API to reroute traffic to a "safe" route, alert the team based on rules applied and mechanisms set up (email, text, dashboard, etc.), etc.

In some embodiments, the management system may control other tasks related to the QKD system for example: management of key generation Frequency, key distribution and exchange, and attack sensing.

In some embodiments, the management system controls network switch and Router Management, for example, through an API connection to switch infrastructure. In some cases, network switch management may include a RESTful API for Integration with Current Infrastructure (SysLog, Classical KMS, Hardware and Infrastructure Management), etc.

In another embodiment, various operations in response to an attack may be selected by the security policy manager. The operations may occur in a particular order. The operations may occur in any order and various operations may be repeated or removed. Furthermore, utilizing deep learning and machine learning algorithm, operations may occur based on the machine learning algorithm analyzing and learning from prior attacks, and to create a behavior baseline or a norm and appropriate operational actions to minimize the threat of an attack or to isolate the attack.

Systems and methods of the present disclosure may be used for any type of data which may need to be transmitted securely. A type of data which may natively be transmitted by a quantum resilient blockchain is cryptocurrency. The illustrated example shows a user interaction with QSMS to perform a transaction via a remote endpoint such as a cellphone.

In some cases, a remote endpoint may comprise biometric authentication (e.g. biometric offline communication). The system may comprise enterprise-level controls including, for example, Active Biometric IVIFA mechanisms on login to Mobile or Web Platforms protects user identity, a key area for hackers to infiltrate.

Further disclosed herein are security management systems. In some cases, a system may comprise: a communications interface configured to receive and transmit at least one portion of transmitted data within a distributed computing system comprising a plurality of nodes; a first node comprising: memory configured to store a first portion of at least one portion of transmitted data, wherein the first portion comprises a copy of a distributed data structure and an addition to the distributed data structure; and at least one computing device operatively coupled to the memory, wherein the at least one computing device are individually or collectively programmed to: (1) receive, at the first node, at least one second portion of the transmitted data from at least one second node of the distributing computing system, (2) decrypt the first portion and each of the at least one second portion using at least one post-quantum cryptographic algorithm to yield at least one decrypted portion; and (3) reassemble the at least one decrypted portion to yield a decrypted copy of the transmitted data; and (4) store the reassembled data.

In some cases, the at least one computing device are configured to compare the decrypted copy of the transmitted data to at least one-other copy of the transmitted data on at least one third node. In some cases, the at least one computing device are configured to hash or encrypt the transmitted data based on a consensus between the first node and at least one third node. In some cases, the one or more computing devices are configured to verify a connection from a remote endpoint, the at least one second node, or the at least one third node using a post-quantum digital signature. In some cases, the at least one computing device are configured to verify a connection from a remote endpoint, the at least one second node, or the at least one third node using a cryptographic algorithm. In some cases, the at least one computing device are configured to verify a connection from the remote endpoint, the at least one second node, or the at least one third node.

In some cases, the system comprises memory configured to store a master copy of the distributed data structure in the memory, wherein the master copy of the distributed data structure is stored encrypted by the at least one post-quantum cryptographic algorithm in the memory. In some cases, the at least one computing device is configured to encrypt the master copy with the one or more post-quantum cryptographic algorithms. In some cases, one or more post-quantum cryptographic algorithms used to encrypt the master copy is changed with another cryptographic algorithm automatically or as needed. In some cases, the distributed computing system comprises a cryptographic policy manager, the policy manager configured to perform one or more of the following: to serve the one or more post-quantum cryptographic algorithms, to manage one or more keys, and to serve one or more digital signatures.

In some cases, the distributed computing system comprises a plurality of network switches, wherein at least one node of the plurality of nodes comprise at least one network switch, the network switch operably connected to the communications interface. In some cases, the communications interface is operably connected to a communications manager providing central monitoring of the distributed computing system. In some cases, the at least one network switch is operably connected to a quantum key distribution device, wherein the quantum key distribution device is used to monitor a connection between the network switch and the communications manager. In some cases, a device is able to detect a break in a connection and wherein the port is not trusted rather than the switch. In some cases, a loss of entanglement invalidates an encryption key.

In some cases, the distributed computing system is a peer-to-peer network. In some cases, the distributed computing system comprises a three tier system, wherein client information is stored on a middle tier rather than at an endpoint or a central server. In some cases, the distributed computing system is an n-tier system.

In some cases, a consensus algorithm is employed by the at least one node to reach a common decision about a state of the distributed data structure. In some cases, the one or more post-quantum cryptographic algorithms used to encrypt transmitted data is changed with another cryptographic algorithm automatically or as needed. In some cases, at least one computing device are configured to verify an identity of another node before transmitting or receiving transmitted data from the another node.

In some cases, the system comprises a user interface in communication with the distributed computing system, wherein the at least one memory is configured to verify an identity of a user of the user interface by a multifactor authentication mechanism or a biometric authentication mechanism. In some cases, the user interface comprises a push style authentication mechanism. In some cases, the communications interface is configured to communicate with a computing system external to the distributed computing system, wherein one or more nodes of the plurality of nodes verifies an identity of the computing system before transmitting transmitted data to or receiving transmitted data from the computing system. In some cases, the distributed computing system comprises a containerized software platform.

In some cases, the distributed data structure is a blockchain. In some cases, the block chain comprises an Ethereum architecture or a hyperledger. In some cases, the transmitted data comprises transaction data relating to an exchange of digital currency.

Disclosed herein are methods of validating transmitted data from a remote location. In some cases, a method may comprise: receiving a portion of the transmitted data from the remote location at a first node of a distributed computing system, wherein the transmitted data comprises a copy of a distributed data structure and an addition to the distributed data structure; receiving, at the first node, at least one second portion of the transmitted data from at least one second node of the distributing computing system; decrypting the first portion and each of the at least one second portion using at least one post-quantum cryptographic algorithm to yield at least one decrypted portion; and reassembling the at least one decrypted portion to yield a decrypted copy of the transmitted data.

In some cases, the method comprises comparing the decrypted copy of the transmitted data to at least one other copy of the transmitted data on at least one third node. In some cases, the method comprises encrypting or hashing the transmitted data based on a consensus between the first node and the at least one third node. In some cases, the method comprises verifying a connection from the remote endpoint, the at least one second node, or the at least one third node using a post-quantum digital signature. In some cases, the method comprises verifying a connection from the remote endpoint, the at least one second node, or the at least one-third node using a cryptographic algorithm. In some cases, the method comprises verifying a connection from the remote endpoint, the at least one second node, or the at least one third node using a quantum key distribution system.

In some cases, the method comprises maintaining a master copy of the distributed data structure, wherein the master copy of the distributed data structure is stored encrypted by the one or more post-quantum cryptographic algorithms.

In some cases, the at least one computing device are configured to encrypt the master copy with the at least one post-quantum cryptographic algorithm. In some cases, one or more post-quantum cryptographic algorithms used to encrypt the master copy is changed with another cryptographic algorithm automatically or as needed. In some cases, the distributed computing system comprises a cryptographic policy manager, the policy manager configured to perform at least one of the following: to serve the at least one post-quantum cryptographic algorithm, to manage at least one key, and to serve at least one digital signature.

In some cases, the distributed computing system comprises a plurality of network switches, wherein at least one node of the plurality of nodes comprise at least one network switch, the network switch operably connected to the communications interface. In some cases, the communications interface is operably connected to a communications manager providing central monitoring of the distributed computing system. In some cases, the at least one network switch is operably connected to a quantum key distribution device, wherein the quantum key distribution device is used to monitor a connection between the network switch and the communications manager. In some cases, a device is able to detect a break in a connection or an attack vector and wherein the port is not trusted rather than the entire switch or node. In some cases, a loss of entanglement invalidates an encryption key.

In some cases, the distributed computing system is a peer-to-peer network. In some cases, the distributed computing system comprises a three tier system, wherein client information is stored on a middle tier rather than at an endpoint or a central server. In some cases, the distributed computing system is an n-tier system.

In some cases, a consensus algorithm is employed by the at least one node to reach a common decision about a state of the distributed data structure. In some cases, the at least one post quantum cryptographic algorithm used to encrypt transmitted data is changed with another cryptographic algorithm automatically or as needed. In some cases, at least one computing device are configured to verify an identity of another node before transmitting or receiving transmitted data from another node.

In some cases, a user interface is in communication with the distributed computing system, wherein at least one is configured to verify an identity of a user of the user interface by a multifactor authentication mechanism or a biometric authentication mechanism. In some cases, the user interface comprises a push style authentication mechanism. In some cases, communications interface is configured to communicate with a computing system external to the distributed computing system, wherein at least one node of the plurality of nodes verifies an identity of the computing system before transmitting transmitted data to or receiving transmitted data from the computing system. In some cases, the distributed computing system comprises a containerized software platform.

In some cases, the distributed data structure is a blockchain. In some cases, the distributed ledger comprises a hyperledger. In some cases, the transmitted data comprises transaction data relating to an exchange of digital currency.

Disclosed herein are a non-transitory computer readable media comprising machine-executable code, that upon execution by at least one processor operatively coupled to a distributed computing system, implements a method for validating transmitted data from a remote location, wherein the distributed computing system comprises at least one node, wherein a first node comprises at least one computing device and a memory. In some cases, a method may comprise: receiving a portion of the transmitted data from the remote location at the first node of the distributed computing system, wherein the transmitted data comprises a copy of a distributed data structure and an addition to the distributed data structure; receiving, at the first node, at least one second portions of the transmitted data from at least one second node of the distributing computing system; decrypting the first portion and each of the at least one second portion using at least one post-quantum cryptographic algorithm to yield at least one decrypted portion; and reassembling the at least one decrypted portion to yield a decrypted copy of the transmitted data.

According to one embodiment of the invention, a data security management system, comprising a communications interface is operatively coupled to a network comprising a plurality of nodes. A first node of the network is configured to process at least one portion of data in the network by the computing device operatively coupled to the communications interface of the node to the network. The computing device on the first node is configured to: a) receive at least one portion of the data; b) apply to the data at least one cryptographic algorithm; c) generate the at least one portion of the data in encrypted forms produced by the cryptographic algorithms; and d) transmit the at least one portion of data in encrypted forms to at least one second node of the network via the communications interface.

In another embodiment, the processing device of the first node is further configured to decrypt the at least one portion of data it receives in encrypted forms produced by the cryptographic algorithms.

In another embodiment, the data security management system further comprising a data storage system operatively coupled to the computing device, where the data storage system is configured to store at least one portion of data in encrypted and non-encrypted forms. The data may be received at the node from a second node in encrypted or unencrypted form.

In another embodiment, the encrypted forms of the at least one portion of the data received by a node, in encrypted form or non-encrypted form, are stored in the data storage system.

In another embodiment, the communications interface connected to the network is further configured to: a) receive the encrypted forms of at least one portion of data from at least one-second node of the network; b) reassemble the encrypted forms of at least one portion of data such that the reassembled encrypted data is capable of being decrypted; c) disassemble the encrypted forms of data received from the computing device into the at least one portion of encrypted data; and d) transmit the disassembled at least one portion of encrypted data to at least one second node of the network.

In another aspect of the invention the data security management system, further comprising a data storage system operatively coupled to the computing device, the data storage system is configured to store at least one portion of data in its encrypted and non-encrypted forms; wherein further, the encrypted forms of the at least one portion of the data are stored in the data storage system. The communications interface is configured to: a) receive the encrypted forms of the at least one portion of data from the at least one second node of said network; b) reassemble the encrypted forms of the at least one portion of data such that the reassembled encrypted data is capable of being decrypted; c) disassemble the encrypted forms of data received from the computing device into the at least one portion of encrypted data; and d) transmit the disassembled at least one portion of encrypted data to the at least one second node of the network.

In another embodiment, the data security management system of claim where the processing at least one portion of the data in the network involves receiving at least one portion of the data in the network. In addition, the data security management system further processes at least one portion of the data in the network, which involves transmitting at least one portion of the data in the network.

In another embodiment, the cryptographic algorithm utilized by the processing device is a post-quantum cryptographic algorithm. A security policy manager operatively connected to the computing device may be utilized and configured to select the cryptographic algorithm used by the computing device.

In another embodiment, the security policy manager is configured to perform a number of functions, at least one of them being: a) enabling use of the at least one post-quantum cryptographic algorithm; b) initiating the creation of at least one key to be used in the at least one post-quantum cryptographic algorithm; c) enabling the use of the at least one key used by the processing device to encrypt the at least one portion of data; and d) managing the at least one key.

In another embodiment, the data security management system of claim uses a post quantum digital signature, whereby the security policy manager can validate a connection from an endpoint, the at least one second node, or the at least one third node to determine if such connection is with a trusted node. The endpoint may be a user, a user device, a switch, a computer, or some other identifiable entity on the network.

In another embodiment, the data security management system, in order to re-encrypt the at least one portion of data, the security policy manager is further configured to exchange the served at least one post-quantum cryptographic algorithm used to encrypt the encrypted forms of the at least one portion of data with other post-quantum cryptographic algorithms.

In another embodiment, the data security management system, in order to re-encrypt the at least one-portion of data, the security policy manager is further configured to initiate the creation of at least one new key and exchange the at least one key with the at least one new key used by the at least one post-quantum cryptographic algorithm.

In another embodiment, the security policy manager is further configured to identify as an attack vector a virtual or physical port of the at least one second node, wherein, in response to said attack vector, the virtual or physical port is identified as a node that is not trusted. In response to the attack vector, the security policy manager can cordon off the virtual or physical port that is not trusted and is the subject of the attack vector.

In another embodiment, the security policy manager is further configured to execute instructions, wherein, to identify a virtual or physical port of the at least one node as an attack vector, the instructions are configured to be programmed using a predefined set of machine codes, and to perform at least one the following: a) select the post-quantum cryptographic algorithm to serve; b) initiate the creation of at least one new key to enable the post-quantum cryptographic algorithms to re-encrypt the at least one portion of data; c) exchange the at least one key used by the processing device to encrypt said transmitted data with the at least one new key to re-encrypt the at least one portion of data; and d) to manage or serve the at least one new key.

In another embodiment, the security policy manager is further configured to execute instructions, wherein, to select the post-quantum cryptographic algorithm to serve, the instructions are configured to be programmed using a predefined set of machine codes.

In another embodiment, the data security management system uses a post-quantum digital signature, and before transmitting data to, or receiving data from a remote endpoint, the at least one second node, or the at least one third node, said security policy manager is configured to validate the identity of a connection from the remote endpoint, the at least one second node, or the at least one third node. Validation of the identity of a connection from the remote endpoint, a second node, or a third node provides assurance that the first node is communicating with a trusted entity.

In another embodiment, in response to an attack vector, said security policy manager is further configured to perform at least one of the following: a) execute instructions programmed, wherein, to identify a virtual or physical port of said one or more nodes as an attack vector, the instructions are configured to be using a predefined set of machine codes; b) identify the attack vector, wherein, the virtual or physical port of the attack vector is identified as a node not trusted; c) initiate the creation of at least one new key; d) exchange the at least one key used by the post-quantum cryptographic algorithm with the at least one new key to re-encrypt the at least one portion of transmitted data; e) select the post-quantum cryptographic algorithm to serve to re-encrypt the at least one portion of transmitted data; f) exchange the at least one served-post-quantum cryptographic algorithm with another post-quantum cryptographic algorithm to re-encrypt the at least one portion of transmitted data; g) initiate the creation of a at least one new key to be used by the post-quantum cryptographic algorithm to re-encrypt the at least one portion of encrypted data stored in said data storage; h) exchange the served at least one post-quantum cryptographic algorithm with another post-quantum cryptographic algorithm to re-encrypt the at least one portion of encrypted data stored in the data storage; and i) manage or serve the at least one key and the at least one new key.

In another embodiment, the data storage is configured to store a first portion of the at least one portion of transmitted data, and wherein the first portion comprises a copy of a distributed data structure and an addition to the distributed data structure. In some embodiments, the distributed data structure comprises a distributed ledger. In other embodiments, distributed ledger is a blockchain. In other embodiments, the distributed ledger is a hyperledger.

The data security management system includes a data storage configured to store in the data storage one or more portions of encrypted data encrypted by the at least one post-quantum cryptographic algorithm. Data stored may be resident at the node or in the data storage and may be encrypted by the processing device for storage in the data storage in an encrypted form. Data may be received at the node from another node on the network, where the data is received in either encrypted or decrypted forms. Data received in encrypted form may be decrypted by the computing device prior to being re-encrypted prior to storage in the data storage. The data storage is configured to store a copy of the data in the data storage, wherein, further, utilizing the at least one post-quantum cryptographic algorithm served by the security policy manager, the copy of the data is stored encrypted by the computing device.

In another embodiment, the security policy manager is further configured to execute instructions, wherein, to identify a virtual or physical port of said first nodes as an attack vector, the instructions are configured to be programmed using a predefined set of machine codes, and to perform at least one-of the following: a) select a post-quantum cryptographic algorithm to serve; b) initiate the creation of at least one new key to be used by the post-quantum cryptographic algorithm to re-encrypt the encrypted data stored in the data storage; and c) manage or serve the at least one new-key.

In another embodiment, in response to an attack vector, the security policy manager is further configured to permanently or temporarily disable the virtual or physical port of the node that is the subject of the attack vector.

According to another aspect of the invention, a method for managing a cryptographic security policy for the transmission of data to and from a first node in a network comprising a plurality of nodes is presented, the method comprising: a) receiving at least one a portion of transmitted data from at least one-second node of the network; b) reassembling the at least one portion of transmitted data into at least one portion of encrypted data to be decrypted; c) decrypting the at least one portion of encrypted data using at least one cryptographic algorithm to yield at least one portion of data.

In another embodiment, the method further comprises the steps of: a) encrypting at least one portion of data using at least one cryptographic algorithm to yield at least one portion of encrypted data; b) disassembling the at least one portion of encrypted data into the at least one portion of transmitted data; and c) transmitting the at least one portion of transmitted data to at least one second node of said network.

In another embodiment, the method further comprises the steps of: a) executing instructions programmed using a predefined set of machine codes to identify a virtual or physical port of at least one second node as an attack vector; b) identifying said attack vector, wherein said virtual or physical port of the attack vector is identified as not a trusted node in response to said attack vector; c) initiating the creation of at least one new key; d) exchanging the at least one key used by the processing device to encrypt said one or more portions of data with the at least one new key to re-encrypt the at least one portion of transmitted data automatically or as needed in response to said attack vector; e) selecting the post-quantum cryptographic algorithm to serve to re-encrypt the at least one portion of transmitted data automatically or as needed in response to said attack vector; f) exchanging the at least one served at least one post-quantum cryptographic algorithm used by the processing device to encrypt the at least one portion of data with another post-quantum cryptographic algorithm to re-encrypt the at least one portion of transmitted data automatically or as needed in response to said attack vector; g) initiating the creation of at least one new key to be used the post-quantum cryptographic algorithm to re-encrypt the at least one portion of encrypted data stored in the data storage as needed in response to the attack vector; and h) exchanging the served at least one post-quantum cryptographic algorithm used by the processing device to encrypt the at least one portion of encrypted data stored in the data storage with another post-quantum cryptographic algorithm to re-encrypt the at least one portion of encrypted data automatically or as needed in response to the attack vector.

According to still another aspect of the invention is a non-transitory computer readable medium comprising machine-executable code, that upon execution by at least one processing device operatively coupled to a network, implements a method for validating transmitted data from a remote location, wherein said network comprises at least one node, wherein a first node comprises the at least one computing device, a memory, a communications interface, and security policy manager, the method comprising: a) encrypting at least one portion of data using at least one cryptographic algorithm to yield at least one portion of encrypted data for storage in said data storage system, or transmission via said communications interface; b) decrypting said one or more portions of encrypted data using at least one cryptographic algorithms to yield at least one portion of data; c) receiving at least one portion of transmitted data from at least one second node of the network; d) reassembling the at least one portion of transmitted data into at least one portion of encrypted data to be decrypted by the computing device; e) disassembling the at least one portion of encrypted data received from the computing device into the at least one portion of transmitted data; and f) transmitting the at least one portion of transmitted data to at least one-second node of said network.

In another embodiment, the non-transitory computer readable medium contains instructions to implement the method, the method further comprising: a) executing instructions programmed using a predefined set of machine codes to identify a virtual or physical port of the at least one node as an attack vector; b) identifying the attack vector, wherein the virtual or physical port of the attack vector is identified as not a trusted node in response to the attack vector; c) initiating the creation of at least one new key; d) exchanging the at least one key used by the processing device to encrypt the at least one portion of data with the at least one new-key to re-encrypt the at least one portion of transmitted data automatically or as needed in response to the attack vector; e) selecting the post-quantum cryptographic algorithm to serve to re-encrypt the at least one portion of transmitted data automatically or as needed in response to the attack vector; f) exchanging the served at least one-post-quantum cryptographic algorithm used by the processing device to encrypt the at least one portion of data with another post-quantum cryptographic algorithm to re-encrypt the at least one portion of transmitted data automatically or as needed in response to the attack vector; g) initiating the creation of at least one new key to be used the post-quantum cryptographic algorithm to re-encrypt the at least one portion of encrypted data stored in the data storage as needed in response to the attack vector; and h) exchanging the served at least one post-quantum cryptographic algorithm used by the processing device to encrypt the at least one portion of encrypted data stored in the data storage with another post-quantum cryptographic algorithm to re-encrypt the at least one portion of encrypted data automatically or as needed in response to the attack vector.

What is claimed is:

1. A data security management system, comprising:
   A communications interface operatively coupled to a network comprising a plurality of nodes, wherein a first node is configured to process at least one portion of data in the network; and
   a computing device operatively coupled to the communications interface,
   wherein the computing device is configured to:
   (1) receive at least one portion of the data;
   (2) apply to the data at least one cryptographic algorithm;
   (3) generate the at least one portion of the data in encrypted forms produced by the at least one cryptographic algorithm; and
   (4) transmit the at least one portion of data in encrypted forms to at least one second node of the network via the communications interface, wherein the communications interface is further configured to:
   (1) receive the encrypted forms of at least one portion of data from at least one second node of the network;
   (2) reassemble the encrypted forms of portion of data such that the reassembled encrypted data is capable of being decrypted;
   (3) disassemble the encrypted forms of data received from the computing device into the at least one portion of encrypted data; and
   (4) transmit the disassembled at least one portion of encrypted data to at least one second node of the network.

2. The data security management system of claim 1, wherein the processing device is further configured to decrypt the at least one portion of data in encrypted forms produced by the cryptographic algorithms.

3. The data security management system of claim 1, further comprising a data storage system operatively coupled to the computing device, the data storage system configured to store at least one portion of data in encrypted and non-encrypted forms.

4. The data security management system of claim 1, wherein, further, the encrypted forms of the at least one portion of the data are stored in data storage system.

5. The data security management system of claim 1, wherein the processing at least one portion of the data in the network involves receiving at least one portion of the data in the network.

6. The data security management system of claim 1, wherein processing at least one portion of the data in the network involves transmitting at least one portion of the data in the network.

7. The data security management system of claim 1, wherein the cryptographic algorithm is a post-quantum cryptographic algorithm.

8. The data security management system of claim 1 further comprising a security policy manager operatively connected to the computing device wherein said security policy manager is configured to select the cryptographic algorithm used by the computing device.

9. The data security management system of claim 8, wherein the cryptographic algorithm is a post-quantum cryptographic algorithm.

10. The data security management system of claim 9, wherein
the security policy manager is configured to perform at least one of:
enabling use of at least one post-quantum cryptographic algorithm;
initiating the creation of at least one key to be used in the post-quantum cryptographic algorithm;
enabling the use of the at least one key used by the processing device to encrypt said at least one portion of data; and
managing the at least one key.

11. The data security management system of claim 10, wherein, using a post quantum digital signature, the security policy manager is further configured to validate a connection from an endpoint, the at least one second node, or the at least one third node.

12. The data security management system of claim 10 wherein, to re-encrypt the one or more portions of data, the security policy manager is further configured to exchange the served at least one post-quantum cryptographic algorithms used to encrypt the encrypted forms of the at least one portion of data with other post-quantum cryptographic algorithms.

13. The data security management system of claim 10 wherein, to re-encrypt the one or more portions of data, the security policy manager is further configured to initiate the creation of at least one previously presented key and exchange the at least one key with the at least one previously presented key used by the at least one post-quantum cryptographic algorithm.

14. The data security management system of claim 10 wherein said security policy manager is further configured to identify as an attack vector a virtual or physical port of the at least one second node, wherein, in response to said attack vector, the virtual or physical port is identified as a node that is not trusted.

15. The data security management system of claim 10 wherein said security policy manager is further configured to execute instructions, wherein, to identify a virtual or physical port of said at least one node as an attack vector, the instructions are configured to be programmed using a predefined set of machine codes, and to perform at least one of the following:
select the post-quantum cryptographic algorithm to serve;
initiate the creation of at least one previously presented key to enable the post-quantum cryptographic algorithms to re-encrypt the at least one portion of data;
exchange the at least one key used by the processing device to encrypt said transmitted data with the at least one previously presented key to re-encrypt the at least one portion of data; and
to manage or serve the at least one previously presented key.

16. The data security management system of claim 10, wherein said security policy manager is further configured to execute instructions, wherein, to select the post-quantum cryptographic algorithm to serve, the instructions are configured to be programmed using a predefined set of machine codes.

17. The data security management system of claim 11, wherein, using a post-quantum digital signature, and before transmitting data to, or receiving data from a remote endpoint, the at least one second node, or the at least one third node, said security policy manager is configured to validate the identity of a connection from the remote endpoint, the at least one second node, or the at least one third node.

18. The data security management system of claim 16, wherein, in response to an attack vector, said security policy manager is further configured to perform at least one of the following:
(a) execute instructions programmed, wherein, to identify a virtual or physical port of said at least one node as an attack vector, the instructions are configured to be using a predefined set of machine codes;
(b) identify the attack vector, wherein, the virtual or physical port of the attack vector is identified as a node not trusted;
(c) initiate the creation of at least one previously presented key;
(d) exchange the at least one key used by the post-quantum cryptographic algorithm with the at least one previously presented key to re-encrypt said one or more portions of transmitted data;
(e) select the post-quantum cryptographic algorithm to serve to re-encrypt said at least one portion of transmitted data;
(f) exchange the served one or more post-quantum cryptographic algorithms with another post-quantum cryptographic algorithm to re-encrypt the at least one portion of transmitted data;
(g) initiate the creation of at least one previously presented key to be used by the post-quantum cryptographic algorithm to re-encrypt the at least one portion of encrypted data stored in said data storage;
(h) exchange the served at least one post-quantum cryptographic algorithm with another post-quantum cryptographic algorithm to re-encrypt the at least one portion of encrypted data stored in the data storage; and
(i) manage or serve the at least one key and the at least one previously presented key.

19. The data security management system of claim 18, wherein the security policy manager is configured to send a notification signal to network nodes to reroute transmission of data to other nodes to avoid nodes subject to an attack vector.

20. The data security management system of claim 1, wherein the data storage is configured to store a first portion of the at least one portion of transmitted data, and wherein the first portion comprises a copy of a distributed data structure and an addition to the distributed data structure.

21. The data security management system of claim 20, wherein the distributed data structure comprises a distributed ledger.

22. The data security management system of claim 21, wherein said distributed ledger is a blockchain.

23. The data security management system of claim 21, wherein said distributed ledger is a hyperledger.

24. The data security management system of claim 10, wherein the data storage is configured to store in the data storage at least one portion of encrypted data encrypted by the at least one post-quantum cryptographic algorithm.

25. The data security management system of claim 10, wherein the data storage is configured to store a copy of the data in the data storage, wherein, further, utilizing the at least one post-quantum cryptographic algorithm served by the security policy manager, the copy of the data is stored encrypted by the computing device.

26. The data security management system of claim 25 wherein the security policy manager is further configured to execute instructions, wherein, to identify a virtual or physical port of said first nodes as an attack vector, the instructions are configured to be programmed using a predefined set of machine codes, and to perform at least one of the following:
select a post-quantum cryptographic algorithm to serve; initiate the creation of at least one previously presented key to be used by the post-quantum cryptographic algorithm to re-encrypt the encrypted data stored in the data storage; and to manage or serve the at least one previously presented key.

27. The data security management system of claim 26 wherein, in response to an attack vector, the security policy manager is further configured to permanently or temporarily disable the virtual or physical port of the node that is the subject of the attack vector.

28. A method for managing a cryptographic security policy for a transmission of data to and from a first node in a network comprising a plurality of nodes, the method comprising:
 (a) receiving at least one portion of transmitted data from at least one second node of said network;
 (b) reassembling said at least one portion of transmitted data into at least one portion of encrypted data to be decrypted;
 (c) decrypting said at least one portion of encrypted data using at least one cryptographic algorithm to yield at least one portion of data
 (d) encrypting at least one portion of data using at least one cryptographic algorithm to yield at least one portion of encrypted data;
 (e) disassembling said at least one portion of encrypted data into said at least one portion of transmitted data; and
 (f) transmitting said at least one portion of transmitted data to at least one second node of said network.

29. The method of claim 28, further comprising the steps of:
 (a) executing instructions programmed using a predefined set of machine codes to identify a virtual or physical port of at least one second node as an attack vector;
 (b) identifying said attack vector, wherein said virtual or physical port of the attack vector is identified as not a trusted node in response to said attack vector;
 (c) initiating the creation of at least one previously presented key;
 (d) exchanging the at least one key used by a processing device to encrypt said at least one portion of data with said at least one previously presented key to re-encrypt said at least one portion of transmitted data automatically or as needed in response to said attack vector;
 (e) selecting at least one post-quantum cryptographic algorithm used by the processing device to serve to re-encrypt said at least one portion of transmitted data automatically or as needed in response to said attack vector;
 (f) exchanging said served at least one post-quantum cryptographic algorithm used by the processing device to encrypt said at least one portion of data with another post-quantum cryptographic algorithm to re-encrypt said at least one portion of transmitted data automatically or as needed in response to said attack vector;
 (g) initiating the creation of at least one previously presented key to be used said post-quantum cryptographic algorithm to re-encrypt said at least one portion of encrypted data stored in said data storage as needed in response to said attack vector; and
 (h) exchanging said served at least one post-quantum cryptographic algorithm used by the processing device to encrypt said at least one portion of encrypted data stored in said data storage with the other post-quantum cryptographic algorithm to re-encrypt said at least one portion of encrypted data automatically or as needed in response to said attack vector.

30. A non-transitory computer readable medium comprising machine-executable code, that upon execution by at least one processing device operatively coupled to a network, implements a method for validating transmitted data from a remote location, wherein said network comprises at least one node, wherein a first node comprises at least one computing device, a memory, a communications interface, and security policy manager, said method comprising:
 (a) encrypting at least one portion of data using at least one cryptographic algorithms to yield at least one portion of encrypted data for storage in a data storage system, or transmission via said communications interface;
 (b) decrypting said at least one portion of encrypted data using at least one cryptographic algorithm to yield at least one portion of data;
 (c) receiving at least one portion of transmitted data from at least one second node of said network;
 (d) reassembling said at least one portion of transmitted data into a at least one portion of encrypted data to be decrypted by said computing device;
 (e) disassembling said at least one portion of encrypted data received from the computing device into said at least one portion of transmitted data; and
 (f) transmitting said at least one portion of transmitted data to at least one second nodes of said network.

31. The non-transitory computer readable medium of claim 30, said method implemented further comprising:
 (a) executing instructions programmed using a predefined set of machine codes to identify a virtual or physical port of said at least one node as an attack vector;

(b) identifying said attack vector, wherein said virtual or physical port of the attack vector is identified as not a trusted node in response to said attack vector;
(c) initiating the creation of at least one previously presented key;
(d) exchanging the at least one key used by the at least one processing device to encrypt said at least one portion of data with said at least one previously presented key to re-encrypt said at least one portion of transmitted data automatically or as needed in response to said attack vector;
(e) selecting at least one post-quantum cryptographic algorithm used by the at least one processing device to serve to re-encrypt said at least one portion of transmitted data automatically or as needed in response to said attack vector;
(f) exchanging said served at least one post-quantum cryptographic algorithm used by the at least one processing device to encrypt said at least one portion of data with another post-quantum cryptographic algorithm to re-encrypt said at least one portion of transmitted data automatically or as needed in response to said attack vector;
(g) initiating the creation of at least one previously presented key to be used said post-quantum cryptographic algorithm to re-encrypt said at least one portion of encrypted data stored in said data storage as needed in response to said attack vector; and
(h) exchanging said served at least one post-quantum cryptographic algorithm used by the at least one processing device to encrypt said at least one portions of encrypted data stored in said data storage with the other post-quantum cryptographic algorithm to re-encrypt said at least one portion of encrypted data automatically or as needed in response to said attack vector.

* * * * *